US005488347A

United States Patent [19]

Gurski

[11] Patent Number: 5,488,347

[45] Date of Patent: Jan. 30, 1996

[54] THERMOSTAT ASSEMBLY WITH FLANGED DISC CUP

[75] Inventor: Michael T. Gurski, Mansfield, Ohio

[73] Assignee: Therm-O-Disc, Incorporated, Mansfield, Ohio

[21] Appl. No.: 251,117

[22] Filed: May 31, 1994

[51] Int. Cl.[6] .......................... H01H 37/04; H01H 37/36; H01H 37/54; G05D 23/10

[52] U.S. Cl. .......................... 337/380; 337/327; 337/329; 337/365; 236/48 R

[58] Field of Search .................................... 337/328, 327, 337/380, 298, 307; 236/48 R

[56] References Cited

U.S. PATENT DOCUMENTS 2,273,307 2/1942 Woods .
3,706,869 12/1972 Sorenson .
3,745,501 7/1973 Juchheim ................................ 337/122
3,757,691 9/1973 Etchell .
3,823,851 7/1974 Waters .
3,843,022 10/1974 Radcliffe .
4,041,433 8/1977 Watson .................................. 337/112
4,155,614 5/1979 Hall .
4,492,946 1/1985 Loescher ................................ 337/365
4,726,594 2/1988 Benke .................................. 273/418
5,101,849 4/1992 Richard .................................. 137/15

*Primary Examiner*—Leo P. Picard
*Assistant Examiner*—Stephen T. Ryan
*Attorney, Agent, or Firm*—Jones, Day, Reavis & Pogue

[57] ABSTRACT

A thermostat has a metal disc cup with a circular cup bottom wall and a cylindrical cup peripheral wall. An inclined flange extends outwardly from the cup peripheral wall. A body whose temperature is to be sensed has a blind hole therein with a closed bottom and a cylindrical periphery. The cup is received in the hole with the cup bottom wall engaging the hole bottom and with the flange under bending stress in engagement with the hole periphery.

14 Claims, 2 Drawing Sheets

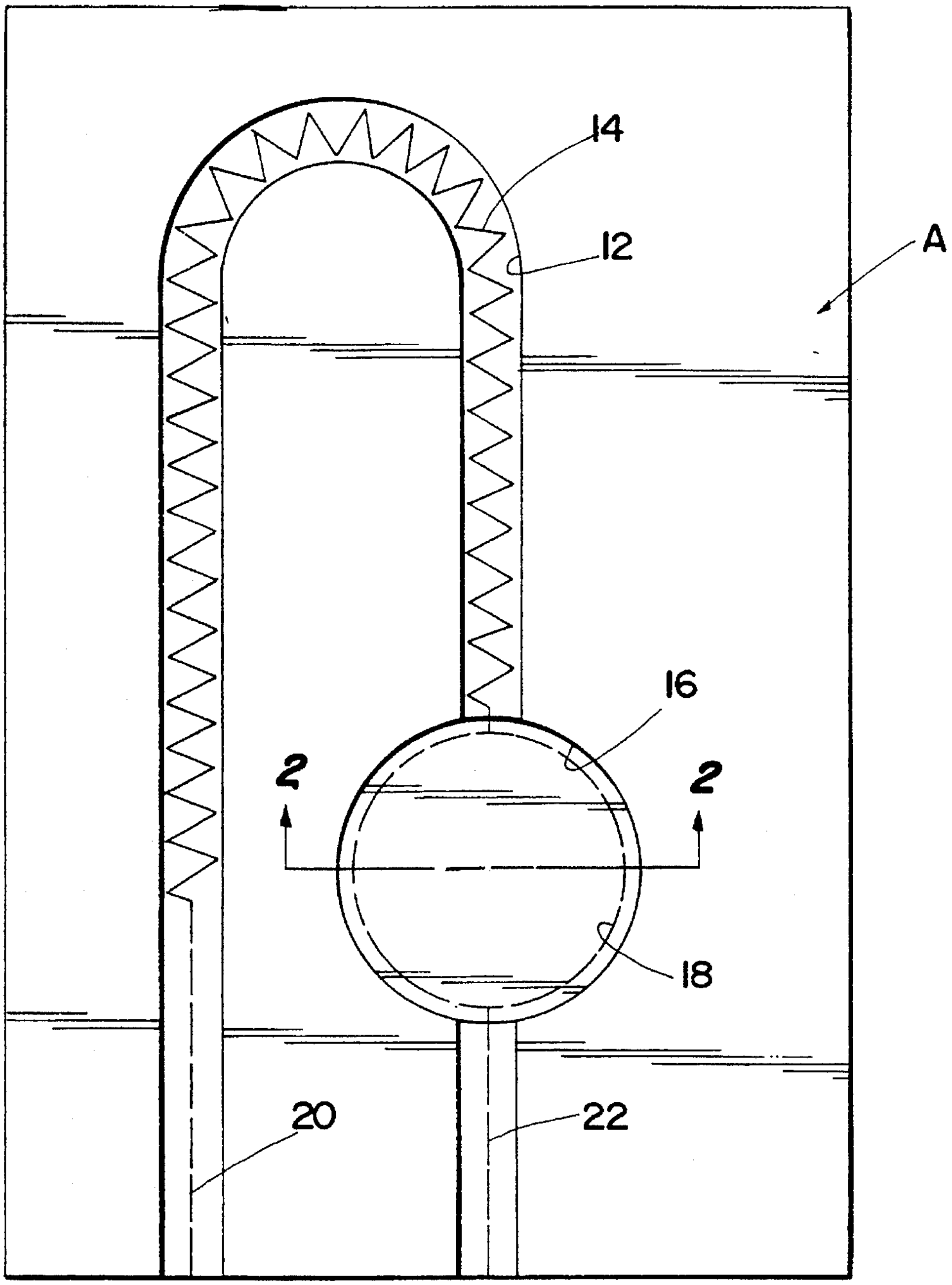
Fig. 1
Fig. 2
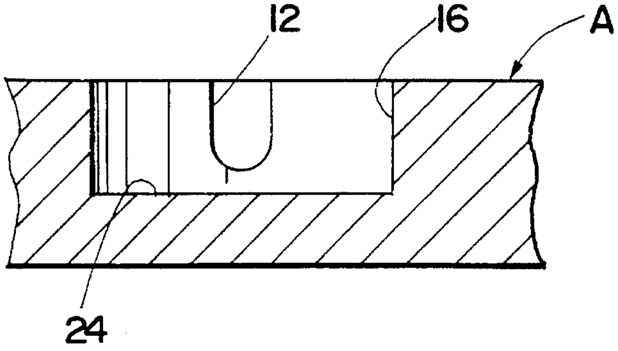

THERMOSTAT ASSEMBLY WITH FLANGED DISC CUP

BACKGROUND OF THE INVENTION

This application relates to the art of temperature sensing and, more particularly, to a thermostat assembly for sensing the temperature of a heated body. Although the invention is particularly applicable to an arrangement for sensing the temperature of a body that is directly heated, it will be appreciated that the invention has broader aspects and can be used for sensing the temperature of a body that is indirectly heated.

It is common to cycle an electric heating element on and off by using a thermostat. When the heating element supplies heat to a body, it is common to position the thermostat in a blind hole formed in the body to be heated. A separate retaining member such as a rubber or foam rubber ring has been positioned within the hole around the thermostat for holding the thermostat in the hole. It is particularly desirable to have the bottom wall of a disc cup on the thermostat in firm engagement with the bottom of the blind hole. Previous retaining arrangements have allowed the thermostat to become loose in the hole so that the bottom wall of the disc cup is no longer in firm engagement with the bottom of the blind hole. It would be desirable to have an improved arrangement for retaining the thermostat in the blind hole and minimize the possibility that the thermostat will become loose.

SUMMARY OF THE INVENTION

A thermostat assembly of the type described includes a disc cup having a circular bottom wall and a cylindrical peripheral wall. An inclined flange extends outwardly from the peripheral wall.

A heated body has a blind hole with a circular hole bottom and a cylindrical periphery. The disc cup is received in the blind hole with the cup bottom wall engaging the hole bottom and with the flange under bending stress in engagement with the hole periphery.

In a preferred arrangement, the flange is inclined at an included angle with the cup peripheral wall between about 125°–145° and more preferably between 130°–140°. In a most preferred arrangement, the included angle is about 135° plus or minus 2°.

The flange has a length between about 0.10–0.14" and most preferably about 0.12". The flange has a terminal end with a diameter that is between about 9–14% larger than the internal diameter of the cylindrical peripheral wall on the disc cup.

The blind hole has a depth that is at least two times greater than the height of the disc cup.

It is a principal object of the present invention to provide an improved thermostat assembly for sensing the temperature of a heated body.

It is also an object of the present invention to provide a thermostat assembly with an improved arrangement for retaining same within a blind hole.

BRIEF DESCRIPTION OF THE DRAWING

FIG. 1 is a top plan view of a heated body having a blind hole therein for receiving a thermostat assembly and having a groove therein for receiving an electric heating element;

FIG. 2 is a partial cross-sectional elevational view taken generally on line 2—2 of FIG. 1;

DESCRIPTION OF A PREFERRED EMBODIMENT

Figure 3:
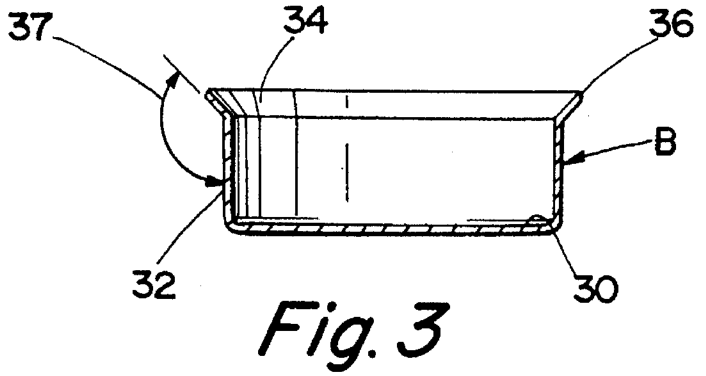
FIG. 3 is a cross-sectional elevational view of a metal disc cup that is used on a thermostat assembly.

Referring now to the drawing, wherein the showings are for purposes of illustrating a preferred embodiment of the invention only and not for purposes of limiting same, FIG. 1 shows a metal body A having a groove 12 therein for receiving an electric heating element 14 and a cylindrical blind hole 16 for receiving a thermostat assembly 18. Electrical leads 20, 22 are connected with the heating element 14 and the thermostat assembly 18. As shown in FIG. 2, hole 16 has a circular hole bottom 24 and a cylindrical periphery. Although specific dimensions are not critical to the present invention and hole 16 could be of many different diameters and depths, dimensions will be given for one typical example. By way of example only and not by way of limitation, hole 16 may have a depth of about 0.525" and a diameter of about 0.690".

FIG. 3 shows a generally cylindrical metal disc cup B. In a preferred arrangement, disc cup B is made of aluminum having a thickness of about 0.012", although it will be recognized that other metals including steel and copper could be used and that the metal thickness could vary. The dimensions of disc cup B may vary depending upon the particular application and specific dimensions will be given by way of example.

Disc cup B includes a circular bottom wall 30 and a cylindrical peripheral wall 32. An outwardly inclined flange 34 extends outwardly from peripheral wall 32. Flange 34 terminates in a sharp terminal end 36. Flange 34 is inclined at an included angle 37 with peripheral wall 32 between about 125°–145° and more preferably between about 130°–140°. In a particular application the included angle is about 135° plus or minus 2°.

The length of flange 34 is between about 0.10–0.14". In a particular application for which dimensional examples are given, the flange length is about 0.12". The diameter of flange terminal end 36 is about 0.686" and the internal diameter of peripheral wall 32 is about 0.600". The diameter of flange terminal end 36 is preferably between about 9–14% larger than the internal diameter of cup peripheral wall 32. The height of disc cup B from the outside of bottom wall 30 to flange terminal end 36 is about 0.237". Thus, the depth of hole 16 in heated body A is at least two times greater than the height of disc cup B.

Flange 34 is illustrated in its most preferred form as being circumferentially uninterrupted. However, it will be recognized that several circumferentially-spaced interruptions may be provided in the flange to provide a plurality of arcuate flanges.

Figure 4:
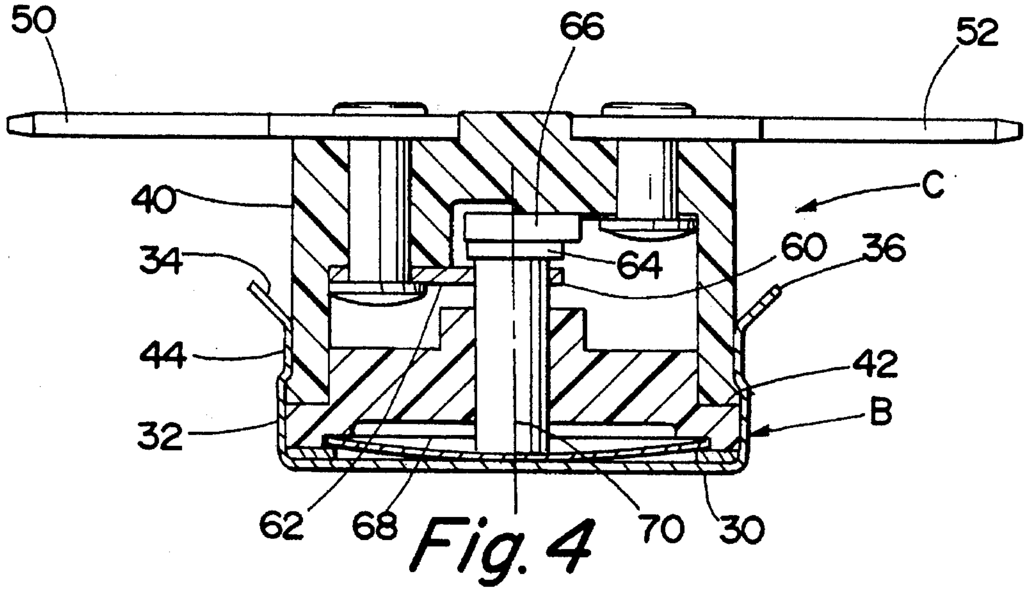
FIG. 4 is a cross-sectional elevational view showing a thermostat assembly.

FIG. 4 shows a thermostat assembly C including a plastic switch case 40 having disc cup B secured thereto. Switch case 40 has an outwardly enlarged end portion 42 and peripheral wall 32 of disc cup B is roll-crimped inwardly as indicated at 44 above enlargement 42 for securing disc cup B to switch case 40. Contrary to what would be expected, the roll-crimping operation causes flange 34 to expand outwardly so that the diameter of flange terminal end 36 becomes larger than the diameter of hole 16 in body A. Therefore, flange 34 is an interference fit within hole 16.

Thermostat assembly C is otherwise conventional and includes terminals 50, 52. A fixed contact 60 is on an arm 62 connected with terminal 50. A movable contact 64 is on a flexible arm 66 connected with terminal 52. A bi-metal disc 68 within disc cup B cooperates with a bumper 70 aligned with resilient arm 66. Contacts 60, 64 are normally closed as indicated in FIG. 4. When a predetermined temperature is reached, bi-metal disc 68 snaps to an oppositely bowed position and this moves bumper 70 upwardly to raise movable contact 64 out of engagement with fixed contact 60. When the bi-metal disc cools down, it will snap back to the position shown in FIG. 4 for reclosing the contacts.

Figure 5:
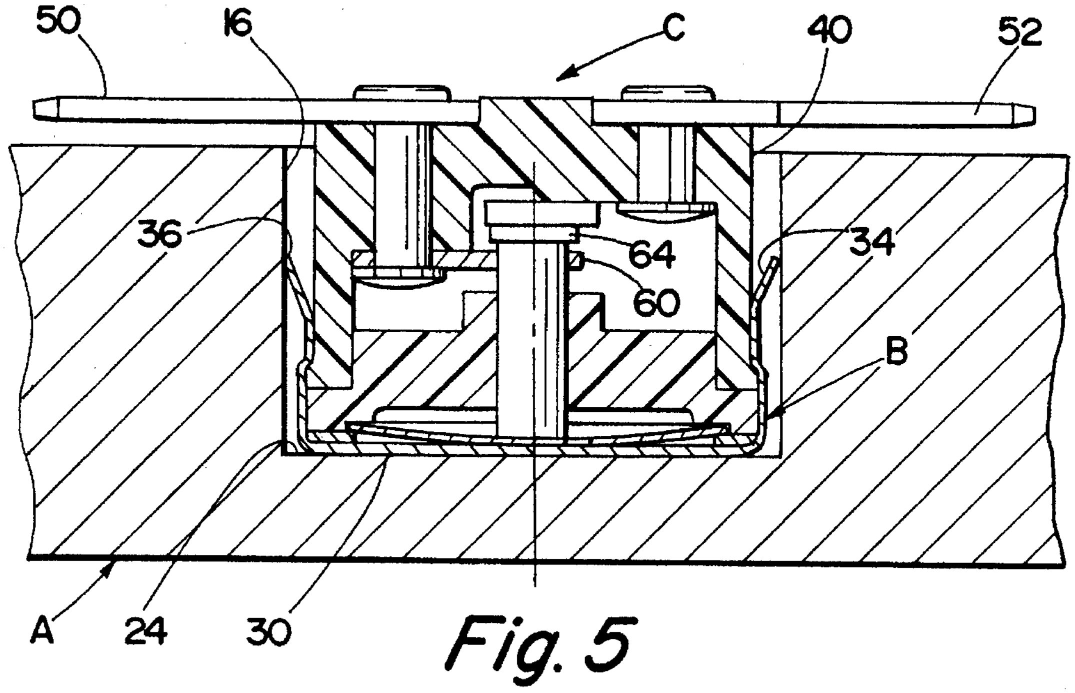
FIG. 5 is a partial cross-sectional elevational view showing the thermostat assembly of FIG. 4 received in the blind hole in the heated body of FIGS. 1 and 2.

Thermostat assembly C is forced into hole 16 as indicated in FIG. 5. The interference fit between flange terminal end 36 and hole 16 places bending stress in flange 34 and the sharp edge of terminal end 36 bites into the periphery of hole 16 for maintaining bottom wall 30 of disc cup B in engagement with bottom 24 of hole 16.

Although the invention has been shown and described with respect to a preferred embodiment, it is obvious that equivalent alterations and modifications will occur to others skilled in the art upon the reading and understanding of this specification. The present invention includes all such equivalent alterations and modifications and is limited only by the scope of the claims.

I claim:

1. A thermostat assembly including a switch housing having a metal disc cup attached thereto, said disc cup having a substantially flat circular cup bottom wall and a cylindrical peripheral wall, an inclined flange extending outwardly from said peripheral wall and upwardly in a direction away from said bottom wall, said flange having a sharp terminal end that faces outwardly away from said bottom wall, said terminal end having a larger diameter than any other portion of said disc cup and said flange having a sufficient length and being free of engagement with said switch housing or with any other part of said thermostat assembly for allowing inward bending deformation thereof without interference from any part of said thermostat assembly.

2. The thermostat of claim 1 wherein the angle between the outer surface of said flange and the outer surface of said peripheral wall is between about 125°–145°.

3. The thermostat of claim 1 wherein said peripheral wall is deformed inwardly into engagement with said switch housing adjacent the intersection of said peripheral wall with said flange for securing said disc cup to said switch housing.

4. The thermostat of claim 1 wherein said flange is circumferentially continuous.

5. The thermostat of claim 1 wherein said flange has a length between about 0.10–0.14".

6. The thermostat of claim 1 including a circular hole having a closed hole bottom and a cylindrical hole periphery, said hole having a depth greater than the height of said disc cup, and said cup being received in said hole with said cup bottom wall engaging said hole bottom, said flange terminal end having a diameter greater than the diameter of said hole and said flange being under bending stress with said sharp terminal end of said flange in gripping engagement with said hole periphery.

7. The thermostat of claim 6 wherein said hole has a depth at least two times greater than the height of said cup.

8. The thermostat of claim 1 wherein said terminal end of said flange has a diameter that is between about 9–14% larger than the internal diameter of said cup peripheral wall.

9. A thermostat assembly including a heated body whose temperature is to be sensed, a blind hole in said body having a hole bottom and a hole periphery, a thermostat having a disc cup with a cup bottom and a cup flange, said cup being received in said hole with said cup bottom engaging said hole bottom and with said flange under bending stress in engagement with said hole periphery.

10. The thermostat of claim 9 wherein said hole has a depth that is at least two times greater than the height of said cup.

11. The thermostat of claim 9 wherein said cup has a cylindrical peripheral wall and said flange is inclined outwardly from said peripheral wall and upwardly in a direction away from said cup bottom, the angle between the outer surface of said flange and the outer surface of said peripheral wall being between about 125°–145°.

12. The thermostat of claim 9 wherein said flange terminates in a flange end having a diameter at least 5% greater than the diameter of said hole.

13. The thermostat of claim 9 wherein said disc cup has a peripheral wall and said flange is inclined outwardly from said peripheral wall and upwardly in a direction away from said cup bottom, said flange having a sharp terminal end that faces outwardly of said peripheral wall and upwardly away from said bottom wall, and said terminal end having a larger diameter than any other portion of said disc cup, that portion of said flange that extends between said sharp terminal end and said peripheral wall being free of engagement with anything and having a sufficient length for allowing inward bending thereof without interference by any part of said thermostat assembly.

14. The thermostat of claim 13 wherein said thermostat assembly includes a thermostat housing and said peripheral wall of said disc cup is deformed inwardly into engagement with said housing adjacent the intersection of said peripheral wall with said flange for securing said disc cup to said housing.

* * * * *